US007051045B2

(12) United States Patent
Cirinna et al.

(10) Patent No.: US 7,051,045 B2
(45) Date of Patent: May 23, 2006

(54) LOGICAL ARCHITECTURE FOR BUSINESS-TO-EMPLOYEE WEB SERVICES

(75) Inventors: Mark Cirinna, Spring, TX (US); John Mason, Mougins (FR); Steve Jones, Windsor (GB); Diana Massaro, Houston, TX (US); Renay Rosckes, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 09/855,878

(22) Filed: May 15, 2001

(65) Prior Publication Data

US 2002/0173973 A1 Nov. 21, 2002

(51) Int. Cl.
*G06F 17/00* (2006.01)

(52) U.S. Cl. ...................... 707/104.1; 707/10
(58) Field of Classification Search ................ 707/10, 707/102, 2–3, 104.1; 705/1, 8–9, 11, 17–18, 705/28, 30; 704/104.1
See application file for complete search history.

(56) References Cited

U.S. PATENT DOCUMENTS

| | | | |
|---|---|---|---|
| 5,319,542 A * | 6/1994 | King et al. ................. 705/27 |
| 5,361,199 A | 11/1994 | Shoquist et al. ............. 705/26 |
| 5,758,327 A * | 5/1998 | Gardner et al. .............. 705/26 |
| 5,848,412 A | 12/1998 | Rowland et al. .............. 707/9 |
| 5,870,717 A | 2/1999 | Wiecha ....................... 705/26 |
| 5,895,454 A | 4/1999 | Harrington ................... 705/26 |
| 5,949,415 A * | 9/1999 | Lin et al. .................... 345/740 |
| 5,970,475 A * | 10/1999 | Barnes et al. ................ 705/27 |
| 5,987,422 A | 11/1999 | Buzsaki ...................... 705/9 |
| 6,023,683 A | 2/2000 | Johnson et al. .............. 705/26 |
| 6,032,145 A | 2/2000 | Beall et al. .................. 707/5 |
| 6,052,670 A | 4/2000 | Johnson ...................... 705/27 |
| 6,076,080 A | 6/2000 | Morscheck et al. .......... 705/400 |
| 6,101,486 A * | 8/2000 | Roberts et al. .............. 705/27 |
| 6,115,690 A | 9/2000 | Wong ........................... 705/7 |
| 6,141,666 A | 10/2000 | Tobin ......................... 715/513 |
| 6,327,628 B1 * | 12/2001 | Anuff et al. ................. 719/311 |
| 6,351,738 B1 * | 2/2002 | Clark .......................... 705/37 |
| 6,363,356 B1 * | 3/2002 | Horstmann .................. 705/26 |
| 6,505,172 B1 | 1/2003 | Johnson et al. .............. 705/27 |
| 6,535,880 B1 | 3/2003 | Musgrove et al. ............ 707/10 |

(Continued)

OTHER PUBLICATIONS

U.S. Appl. No. 09/718,703, filed on Nov. 22, 2000, by Vivian Kornegay, Charles Briese and Vercie Lark entitled "Hardware Architecture for Business-To-Employee Web Services".

(Continued)

*Primary Examiner*—Leslie Wong
*Assistant Examiner*—Susan Rayyan (57) ABSTRACT

A system and method for using a website to provide tools that enable an employee perform employment-related functions. The system includes a website interface, data and applications stored in memory, and a data engine to provide the applications with the data to operate. The system may also include an external application accessible by the data engine via a link to a second electronic information system provided by a partner business. The method includes developing a website that utilizes applications and data to form tools to enable an employee perform employment-related tasks. The method also includes providing the computer system with a data engine to locate specific data in memory and transfer the specific data to an application to enable a tool to perform its employment-related function. The method further includes providing a website interface to access the tools.

18 Claims, 10 Drawing Sheets

U.S. PATENT DOCUMENTS

| | | | |
|---|---|---|---|
| 6,606,603 B1 | 8/2003 | Joseph et al. | 705/26 |
| 6,606,744 B1 | 8/2003 | Mikurak | 717/174 |
| 6,629,135 B1* | 9/2003 | Ross et al. | 709/218 |
| 6,643,624 B1 | 11/2003 | Phillippe et al. | 715/507 |
| 6,792,605 B1* | 9/2004 | Roberts et al. | 719/313 |
| 2001/0034622 A1* | 10/2001 | Davis | |
| 2001/0047347 A1* | 11/2001 | Perell et al. | 707/1 |
| 2002/0007318 A1* | 1/2002 | Alwick | |
| 2002/0022982 A1* | 2/2002 | Cooperstone et al. | 705/7 |
| 2002/0065877 A1* | 5/2002 | Kowtko et al. | 709/203 |
| 2002/0138281 A1* | 9/2002 | Cirulli et al. | |
| 2002/0147757 A1* | 10/2002 | Day et al. | 709/1 |

OTHER PUBLICATIONS

Sliwa, Carol: "Net Buying Standard Tool a While"; Sep. 1998; Computerworld, vol. 32, No. 39.

Web page printout, http://web.archive.org/web/19990427044620/http://www.earthlink.net, archived Apr. 1999.

Web page printout, http://web.archive.org/web/1999042744620/http://www.earthlink.net/about/jobs/listings_4.html, archived May 1999.

Coomber, a WIN/WIN Situation?, Canadian Insurance, Oct. 1997, p. 16, 18-19 [PROQUEST].

Bergsman, Business Not as Usual, Journal of Property Management, vol. 65, Issue 3, May/Jun. 2000, p. 26.

Morphy, Procurement Enters the Digital Age, Export Today's Global Business, vol. 16, Issue 1, Jan. 2000, p. 22-30 [EBSCO].

Mark, MRO Online: What's the Point?, Purchasing B2B Sep. 2000, p. 28, [PROQUEST].

* cited by examiner

LOGICAL ARCHITECTURE FOR BUSINESS-TO-EMPLOYEE WEB SERVICES

BACKGROUND OF THE INVENTION

1. Field of the Invention

The present invention relates generally to a system and method of providing web services. More particularly, the present invention relates to a system that can be configured to enable a business to use the Internet to provide employees with tools.

2. Background of the Related Art

This section is intended to introduce the reader to various aspects of art that may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The Internet has become an increasingly popular means for businesses and consumers to transmit information and to buy and sell goods and services. The Internet provides a business with the opportunity to reach a large consumer market. Consequently, businesses have created Internet web sites to engage in commerce with consumers. These types of websites are known as business-to-consumer websites.

The Internet also provides a business with the opportunity to reach a larger business market. For example, the Internet makes it easy for manufacturers to conduct business with their suppliers. Consequently, businesses have created Internet websites to engage in commerce with other businesses. These types of websites are known as business-to-business websites.

A particular segment of the market for information, goods, and services that has gone untapped on the Internet is employees, or workers employed by a variety of businesses with similar employment functions. The employees and workers may be a business's own employees or the employees of other businesses. Employees have particular needs and requirements for information, goods, and services that cannot be met by business-to-business or business-to-consumer websites. For example, the process that a typical consumer would use to purchase goods is entirely different from the process that an employee would use to purchase goods. In this example, a consumer seeking an item would search the Internet for at least one website that offered the desired item for sale. The diligence of the search of websites on the Internet would rest entirely with the consumer. A consumer can choose to search through one website or a dozen. The consumer can then purchase the item from one of the websites with a credit card and await for arrival of the item. The evaluation of the quality of the item, and of the supplier, rest entirely with the consumer.

This method of procurement may not be an acceptable method for an employee of a business. Having each employee spend time on the Internet searching for items is inefficient. Furthermore, for a variety of reasons employees are not typically allowed to purchase items at will at company expense. A managing authority within the business must usually authorize purchases. As a result, businesses typically establish formal procedures for the procurement of assets that an employee needs or desires to perform job-related functions. These formal procedures may be quite time consuming, generate considerable amounts of documentation, and require several layers of employees and managers to function. These formal procedures may result in lower productivity and increased expense.

Additionally, the internal electronic information systems that businesses typically use to assist their employees are limited in their scope. Typically, workers outside the company cannot access these systems to obtain information, goods or services. Furthermore, even a business's employees may not have access to the system when they are away from the business.

The present invention may be directed to one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a system to enable employees of an identified company to perform employment-related functions for the identified company. The system includes a first electronic information system which is accessible from a website interface. The first electronic information system has: data related to the identified company stored in electronic storage; a plurality of tools to enable the employees of the identified company to perform a plurality of employment-related functions for the identified company, each tool utilizing the company-related data to perform its intended function; and a data engine operable to provide a link from the first electronic information system to a second electronic information system provided by a business partnered with the identified company, the link being transparent to the employees.

In accordance with another aspect of the present invention, there is provided an electronic information system for providing tools to employees of an identified company to perform employment-related functions for the identified company. The system includes: an information database containing data related to the identified company; an interactive Internet website that enables only the employees of the identified company to access and interact with the electronic information system; a plurality of tools that direct the system to perform operations to assist the employees to perform employment-related functions for the identified company; an information engine that operates between the information database and the plurality of tools; and an application to identify each of the employees accessing the system, wherein the system configures the interactive Internet website based on each employees' identity.

In accordance with yet another aspect of the present invention, there is provided a method of using a computer system to provide tools to employees of an identified company to enable the employees to perform employment-related functions for the identified company. The method includes the acts of: providing a computer system with a website interface; providing the computer system with company-related data and a plurality of applications stored in memory; coordinating the operation of the data and the plurality of applications to form a plurality of tools accessible by only the employees via the website interface, each tool performing an employment-related function for the employee; and providing the computer system with a data engine to locate specific company-related data in memory and transfer the specific company-related data to an application to enable each tool to perform its employment-related function.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
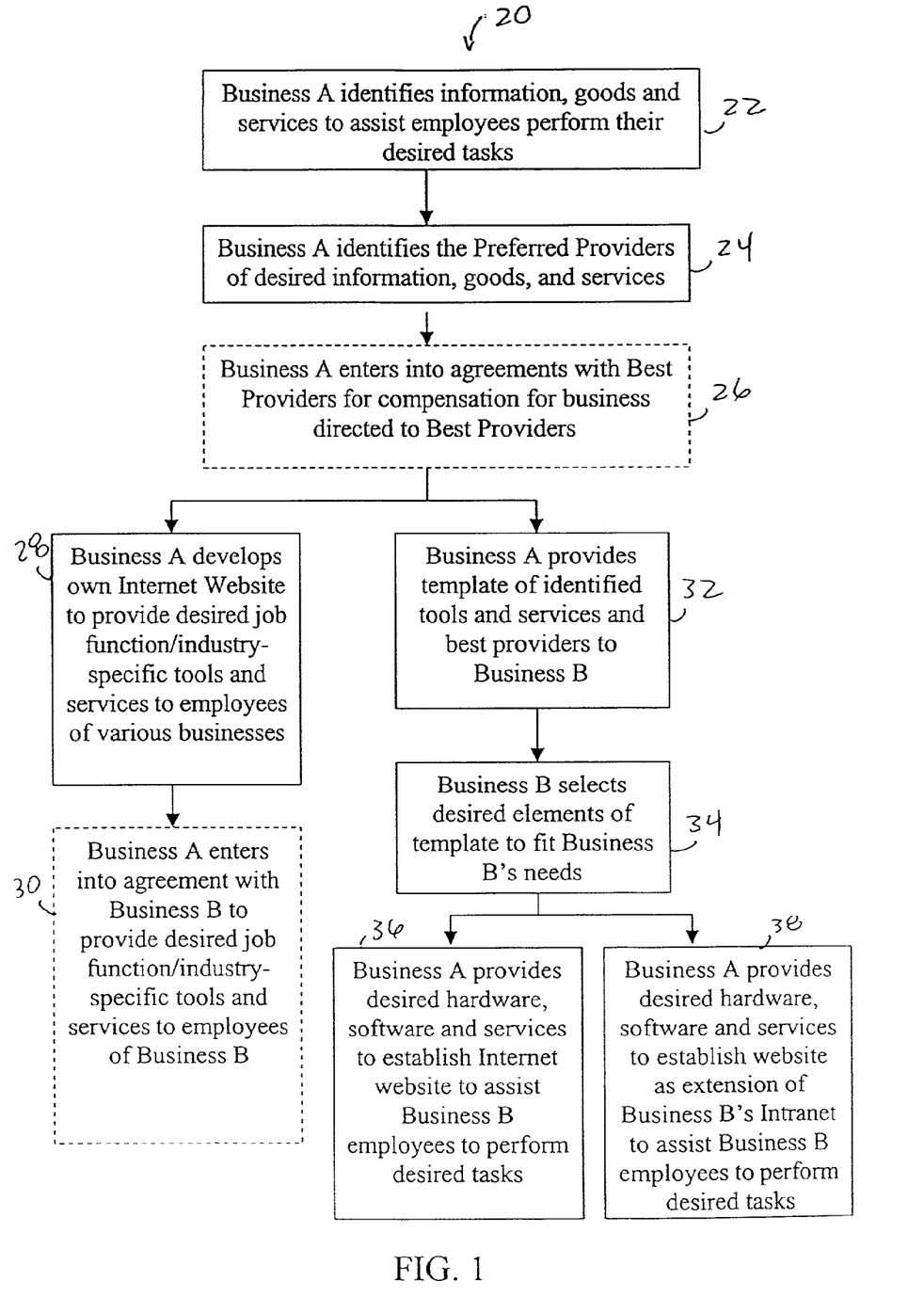
FIG. 1 illustrates a block diagram of a method of providing job function or industry specific tools to employees, in accordance with the present invention.

Turning now to the drawings, FIG. 1 illustrates a block diagram of a method, generally designated by the reference numeral 20, of providing job function or industry specific tools to employees. Tools are resources that assist an employee in performing their job, such as providing an employee with information, goods or services. The scope of tools that may be provided to employees is virtually limitless. Tools may be used to perform tasks such as obtaining technical information from vendors, obtaining office equipment from an employer or a third party, or making travel arrangements online. In the illustrated method, a first business, Business A, initially identifies relevant information, goods and services that may assist employees in performing their jobs, as provided by block 22. In block 24, Business A identifies the best sources, i.e., the preferred providers, of the different information, goods or services identified in block 22. The determination of which sources are the preferred providers may be based on a variety of factors, such as price and quality.

As an option, Business A may enter into business agreements with the preferred providers, as provided in by block 26. For example, Business A may contract with a preferred provider for a sales commission for each good purchased from the preferred provider by an employee directed to the preferred provider by the website. Additionally, Business A may negotiate volume discounts for information, goods or services purchased from the preferred providers.

Business A may develop its own website to provide tools to employees of its own business or of other employers, as provided in block 28. Employees performing specific jobs, in specific industries, or by general employees, may use the tools provided by the website. The website may be linked to websites operated by a variety of additional information sources. Advertisement banners may also be placed on the website.

Business A may enter in an agreement with a second business, Business B, to provide tools to Business B's employees, as provided in block 30. Portions of the website may be configured for the exclusive use of Business B. Business B's employees may use the website for a variety of business functions, such as procurement, finance, sales, training, scheduling, etc. For example, an employee may access the website and request a desired good from a menu of goods developed by Business A, with the goods to be provided by a preferred provider. The website may then direct the request for the desired good to the appropriate approval authorities within Business B, if desired. Upon approval, the website may enable an approval authority within Business B to direct a purchase order to a website operated by a preferred provider. Upon delivery of the desired good, an employee may then access the website and notify an appropriate payment authority of the delivery of the good. The payment authority may then use the website to transfer funds electronically to the preferred provider. The system may be configured with security precautions to ensure that only authorized personnel of Business B are allowed to access the portions of the website configured for Business B's use.

Additionally, or alternatively, Business A may enable businesses to develop their own Internet websites, as provided in block 32. Business A may develop a template of tools as well as preferred providers. Business A may then provide the template to a second business, Business B. The template may allow employers, such as Business B, to choose the particular tools, as well as their own preferred providers, as provided in block 34. Preferably, Business A would then provide the hardware, software and services as necessary to enable Business B to establish an Internet website for the use of Business B's employees, as referenced by block 36. Business B's employees may then use the Internet website to obtain tools to enable, or assist, them perform their jobs. Furthermore, the website may be configured so that workers employed by other businesses may access portions of the website to obtain tools.

Alternatively, Business A may enable businesses to develop and expand their current Intranet systems into websites, as provided in block 38. Business A may provide Business B with the hardware, software and services as appropriate to develop a website that would provide Business B's employees with tools. Such a website may combine features of Business B's Intranet with the template developed by Business A.

In all of the methods described above, the website may also be configured to enable the employee to utilize tools accessible from the website for their own personal use as a consumer.

There are a variety of functional features that may be incorporated into an Internet website to provide general, job function, or industry specific tools to employees. One function that an Internet website may provide is to enable employees to complete commercial transactions for the purchase of goods and services over the Internet. The types of transactions that may be completed via the Internet website include all manner of E-commerce, such as the ordering of computer hardware or software, literature, airline tickets, etc. The goods or services may be obtained from an internal source, from a preferred provider, or from some other external source. The website may be configured so that the purchase order may be electronically and seamlessly routed to the appropriate authorizing, financing, or accounting authorities, as necessary, depending upon the procedural framework that the business has established for the procurement of goods or services.

The Internet website may be used to provide information to employees in a variety of ways. One way in which information may be provided to employees is through the content of the website. Information may be produced specifically for the website. Information may also be provided via links to other websites. General, job function or industry specific information may be gleaned from websites across the Internet. Product or service news may be provided via links to websites operated by the preferred providers or other product or service providers. Additionally, the content of the website may be customized for each employee. Information, including information about goods and services of particular relevance to an employee, may be displayed on the website.

Information may also be disseminated to employees via online interaction with other employees logged onto the website. This interaction may be in the form of chat rooms, a customized newsletter, or discussion groups. Employees may also be connected online to experts or consultants provided by the preferred providers, or other third party businesses. For example, a technician having problems repairing a computer may enter a chat room or discussion group for guidance and assistance from other technicians employed within the industry.

Information may also be used to perform customer profiling. This information may be obtained by tracking the employees use of the website, such as purchases and web pages visited. Among other things, this information may be used to configure the website for each employee or to target advertising to specific employees based on their use of the website. Additionally, the customer profiling enables the system to intelligently manage the data. The website may be used to analyze an employee's use of the website and proactively provide tools, such as information or online services, to the employee that had not been specifically requested. For example, an employee profile may have been determined that an employee has accessed the website numerous times for information on a specific topic. The system may then notify the employee by e-mail when new information on that topic has been added to the website. Additionally, if an employee has accessed information regarding a particular type of good, the website may notify the employee when new or similar types of products are available for purchase.

Figure 2:
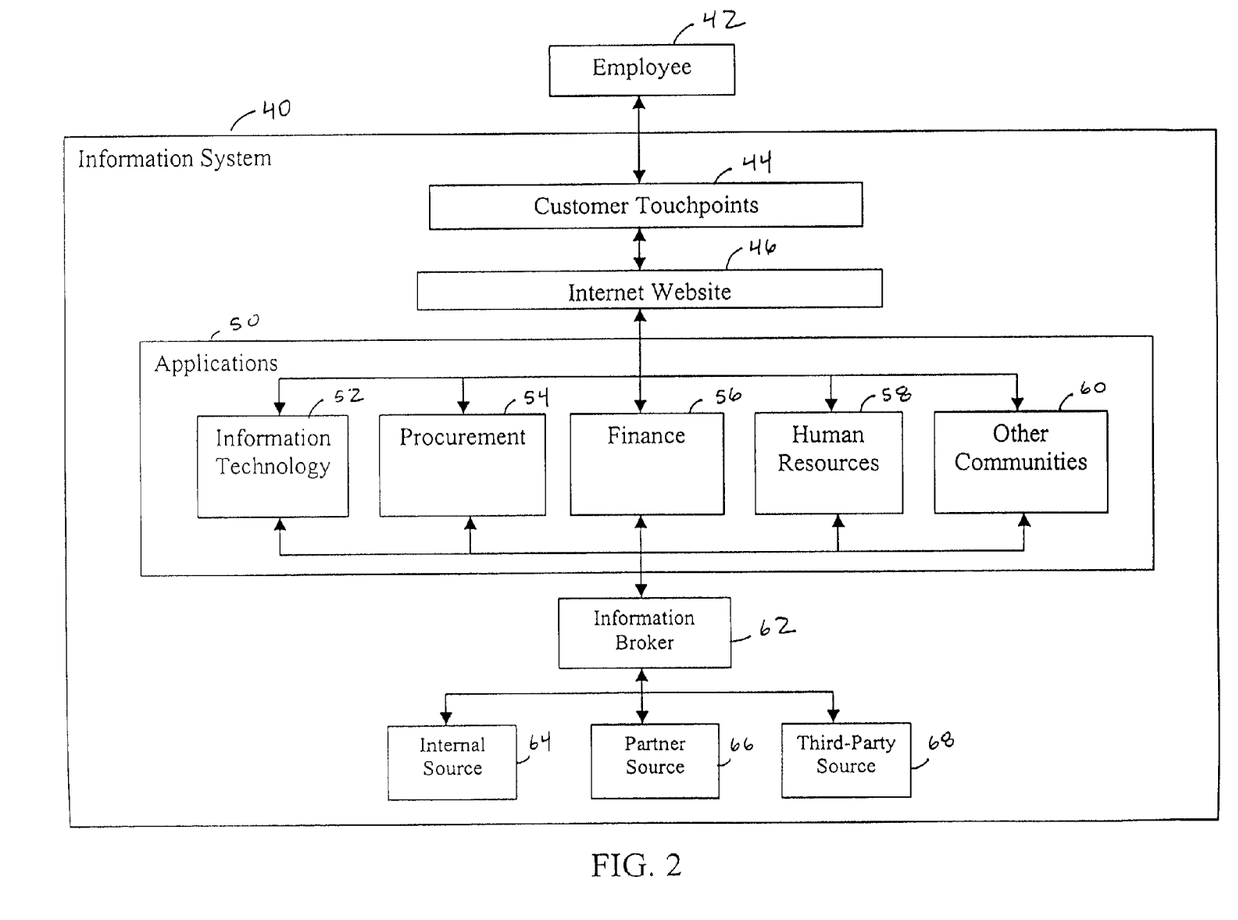
FIG. 2 illustrates a block diagram of a system for providing an employee with general, job function or industry specific tools, in accordance with the present invention.

Referring generally to FIG. 2, a block diagram is shown of a system 40 for providing an employee with desired tools. The system 40 enables an employee 42 to utilize customer touchpoints 44 to access an Internet website 46. The customer touchpoint 44 may be any of a variety of different devices, such as a desktop computer, a laptop computer, a hand-held computer, a telephone, or even the mail. The Internet website 46 enables the employee 42 to operate various software application tools 50.

In the illustrated embodiment, the software tools are organized topically so that an employee may utilize different may on the website depending upon the employees area of interest. For example, employees seeking tools related to information technology may use an application devoted to information technology, as provided in block 52. Another application may be devoted specifically to the procurement of goods and services, as provided in block 54. Another application may be devoted to finance, as provided in block 56. Still another application may be devoted to human resources, as provided in block 58. Other applications may be devoted to other needs for tools, including those relevant to all employees, as provided in block 60. An employees area of interest may be determined by their job function or by the specific tools desired. An information technology employee may also need human resources information. The applications may be organized so that the information is available at an information technology application 52 or at a human resources application 58, or at both.

In the illustrated embodiment, information for the applications 50 is obtained through the use of an information broker, as provided in block 62. In the illustrated method, the information broker 62 searches for the desired tools among a variety of sources. Some tools may be obtained through internal sources within the company, as provided in block 64. A best provider or partner, as provided in block 66, may provide other tools. Finally, additional tools may be obtained from unaffiliated third-party sources, as provided in block 68. In the illustrated method, the Internet website has closed links to external sources, such as a preferred provider or third-party source. Thus, there is seamless communication between the Internet website and any Internet websites operated by preferred providers or third-party sources.

Figure 3:
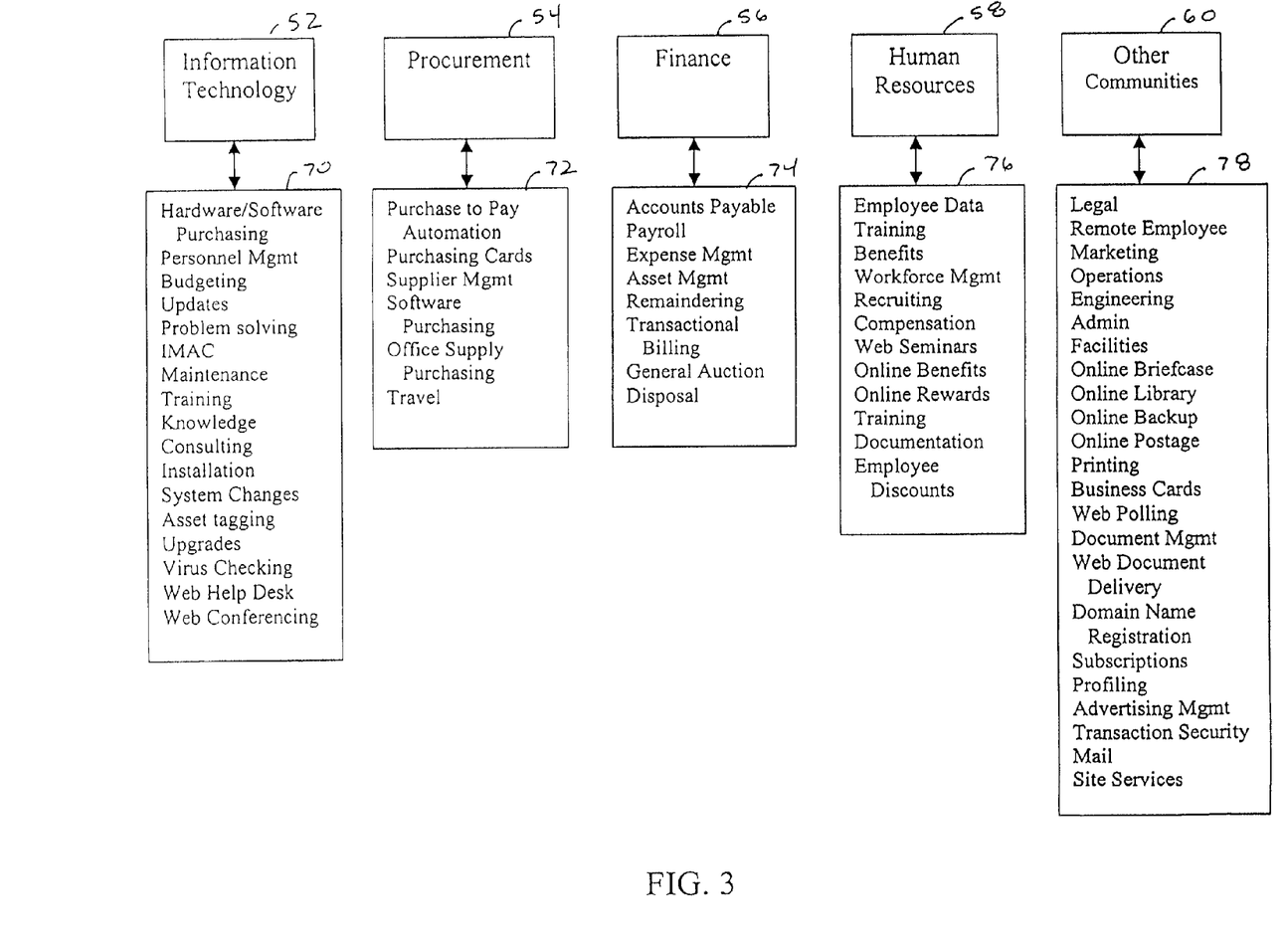
FIG. 3 illustrates an example of some of the general, job function or industry specific tools obtainable via an Internet website, in accordance with the present invention.

Referring to FIG. 3, a sample is provided of general, job function, or industry specific tools that may be obtained via the Internet website. For example, employees may access the website and use the information technology applications 52 to obtain a variety of tools related to information technology or desired by employees in information technology fields, as provided in block 70. An information technology manager may use this portion of the website for various functions, such as personnel management, budgeting, maintaining technological proficiency, problem identification and resolution, and end user training and support. The website may also be used to provide a manager with information on pricing, delivery updates, product comparisons, demand forecasting, and system integration guidelines.

The website may also be used for obtaining and providing services such as information management and control, or IMAC, maintenance and training, as well as documenting maintenance, training, assets, and system changes. The website may also be used for system upgrades and virus checking. Information technology related information may also be provided by the website, such as news relevant to the field of information technology, information technology training, a web help desk, or providing web conferencing.

Employees may access the website and use a procurement application 54 to obtain a variety of tools related to procurement or desired by employees in procurement fields, as provided in block 72. The Internet website may be used to provide for the automation of the procurement process from the point of ordering the goods or services by the employee to the point of payment of the supplier. For example, a purchase order may automatically be generated that is routed to a procurement application 54 when an information technology worker orders a product from the website. Procurement workers may then utilize a different procurement application tool 54 to process the request form. The procurement tools 54 may also be closed-linked to applications on websites maintained by third parties, such as preferred providers. A procurement employee may use a procurement application to direct the preferred provider to ship the computer. Additionally, the order may be directed to a finance application so that a finance employee may docket payment for the computer. As a result, all of the functions of purchasing may be performed from the website and would be invisible to the information technology employee who initially ordered the computer. The Internet website may thus be used to provide a single Internet website that seamlessly connects employees within one company to suppliers in another company. Additionally, employees may use a procurement application 54 to manage suppliers, plan trips through travel agencies, and purchase office supplies.

Employees may also access the website and use a finance application 52 to obtain a variety of tools related to finance or desired by employees in finance fields, as provided in block 74. The finance application may be used for payroll, expense management, asset management, and remaindering.

The Internet website may also include a variety of human resource applications 58, as provided in block 76. For example, the website may be used to develop employee data. The website may also be used to document and track employee training and assist in workforce management, such as scheduling vacations and recruiting. Additionally, the website may be used to provide a variety of information common to all employees, such as benefits.

A variety of other employment applications 60 may be provided by the website, as provided in block 78. Legal questions and concerns may be directed to legal authorities via the website. Standard form contracts approved by the business's legal authority may be stored and accessible from the website. Employee data, or profiling, may be developed by tracking employee use of the website, or the Internet. Additional services such as engineering, operations, administration, or facilities may all use and be accessible from the website. Furthermore, this is not an exclusive list of tools that may be provided from the website.

Figure 4:
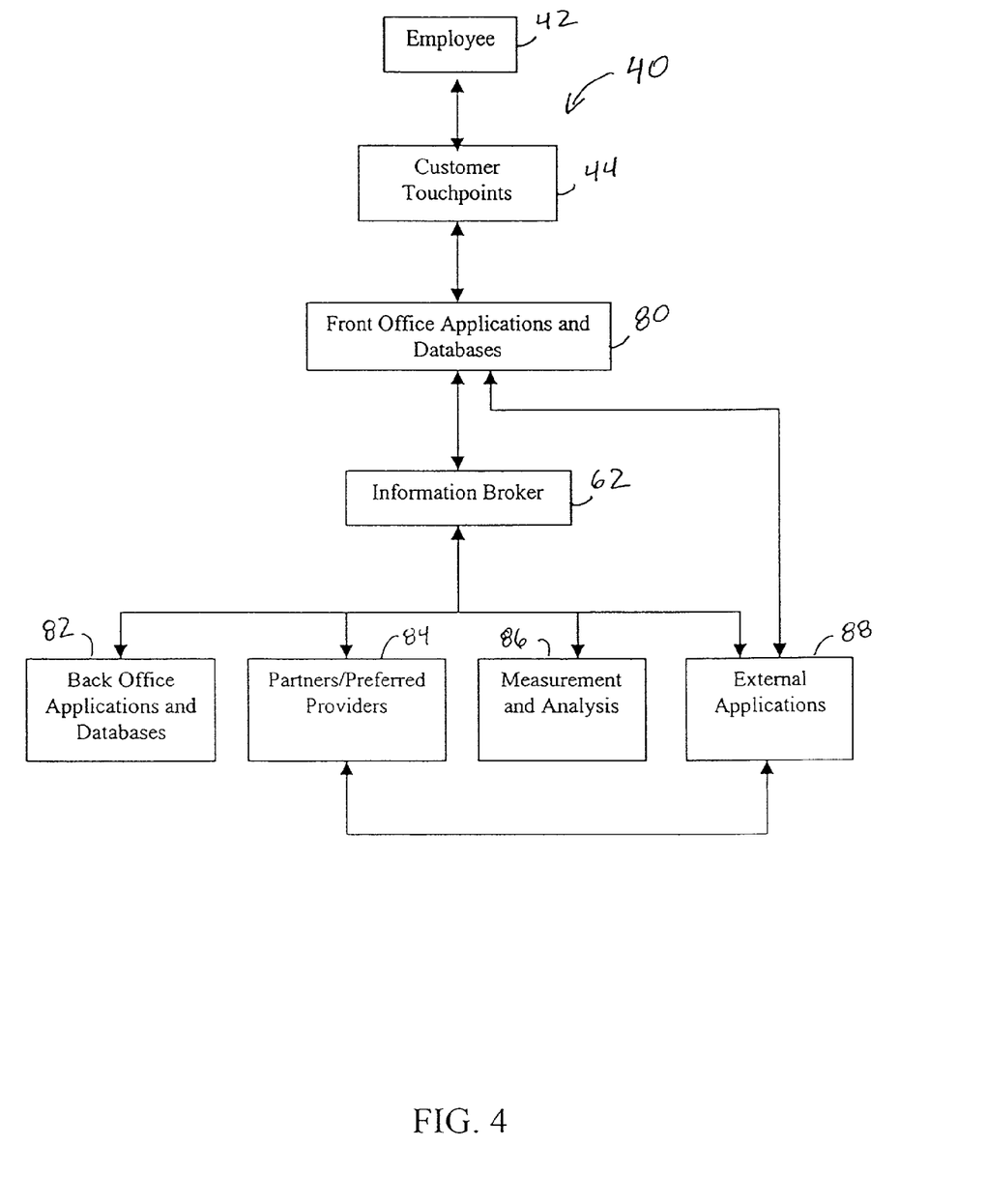
FIG. 4 illustrates a block diagram of an Internet system for providing an employee with general, job function or industry specific tools, in accordance with the present invention.

Referring generally to FIG. 4, a block diagram is shown illustrating the role of the information broker 62 in directing information around the system 40. The information broker 62 moves information around the system to ensure that applications can operate with the correct information. In the illustrated system, an employee 46 utilizes a customer touchpoint 44 to interact with a business. The customer touchpoints 44 connect the employee with Front Office applications and databases, as provided in block 80. The front office applications and databases 80 are applications that the employee can interact with in real time. The system also includes other applications that an employee cannot interact with in real time or that are not accessible to all employees. The back office applications, as provided in block 82, are those applications that are used to run and report on the business. Partners or preferred providers may also provide information, as well as applications, as provided in block 84. Measurement and analysis, as provided in block 86, is the central storage area for information and analysis. External applications, as provided in block 88, are any application at a third party source of tools.

The information broker 62 retrieves data from a source of information and supplies the data to the application in need of the information. In the illustrated embodiment, an employee 42 may direct a front office application 80 to provide the employee with desired tools. If the front office application 80 does not have the data needed to provide the employee 42 with the desired tools the front office application 80 may request the data from the information broker 62. The information broker 62 will seek out the data from one of the sources of data. In the illustrated embodiment, the potential sources of data are the back office applications 82, the partners or preferred providers 84, measurement and analysis applications 86, or the external applications 88. Other front office applications 80 may also serve as sources of data. If available, the information broker 62 will retrieve the data and supply it to the front office application 80. However, this is not an exclusive list of sources of data that an Internet website may utilize to provide tools to employees.

In the illustrated embodiment, the system may be configured so that some applications may communicate information to other applications without the use of the information broker 62. Data may be transferred between a front office application 80 and an external application 88. Additionally, data may be transferred between partners/preferred providers 84 and an external application 88.

Figure 5:
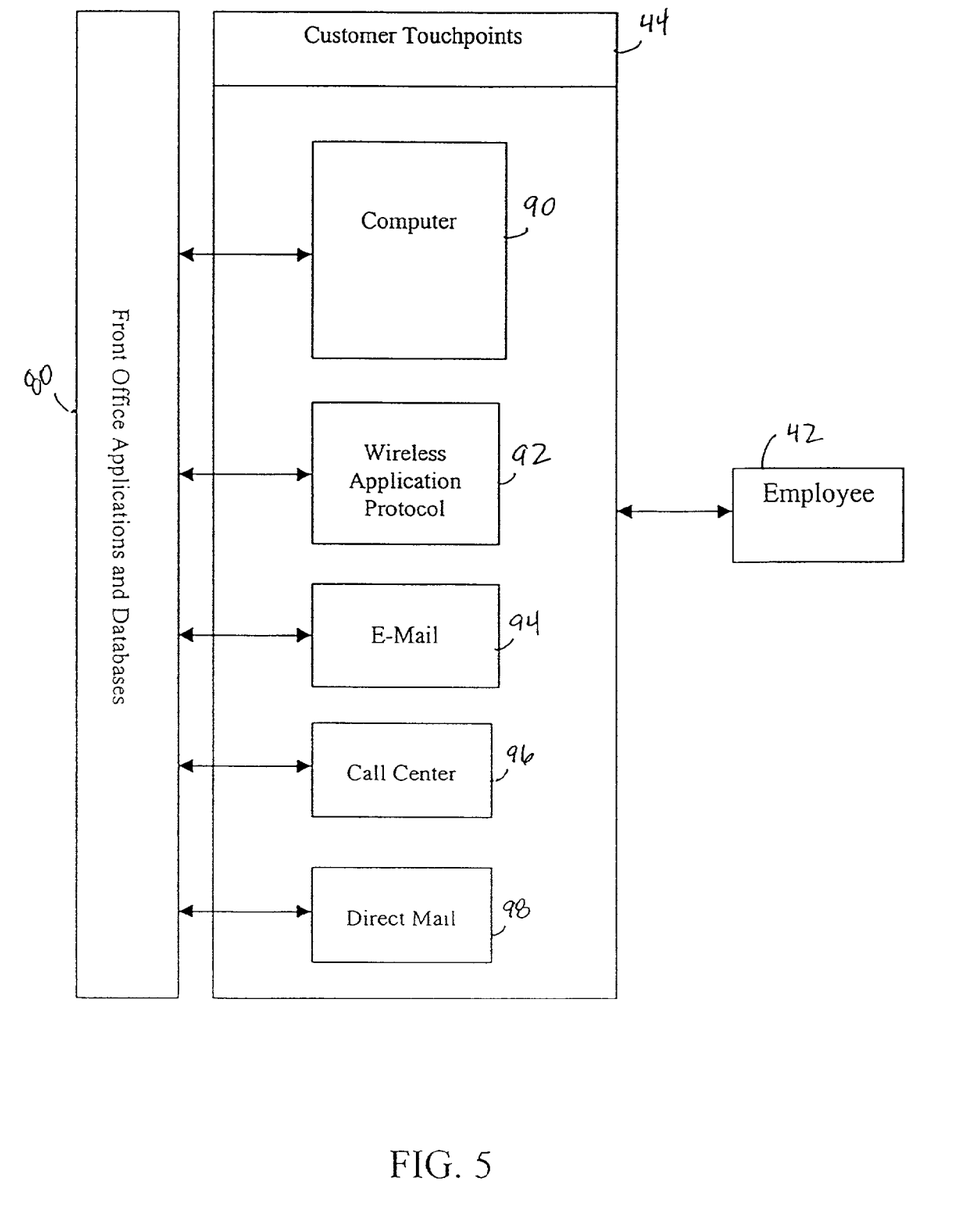
FIG. 5 through FIG. 7 illustrate various aspects of the system of FIG. 4 in greater detail.

As best illustrated in FIG. 5, customer touchpoints 44 may include a computer 90, a wireless device 92, e-mail 94, a customer call center 96 or even direct mail 98. Wireless devices 92 that may access the website include notebook computers, digital mobile phones, pagers, and personal digital assistants. An employee uses the customer touchpoints 44 to interact with front office applications and databases 80.

Figure 6:
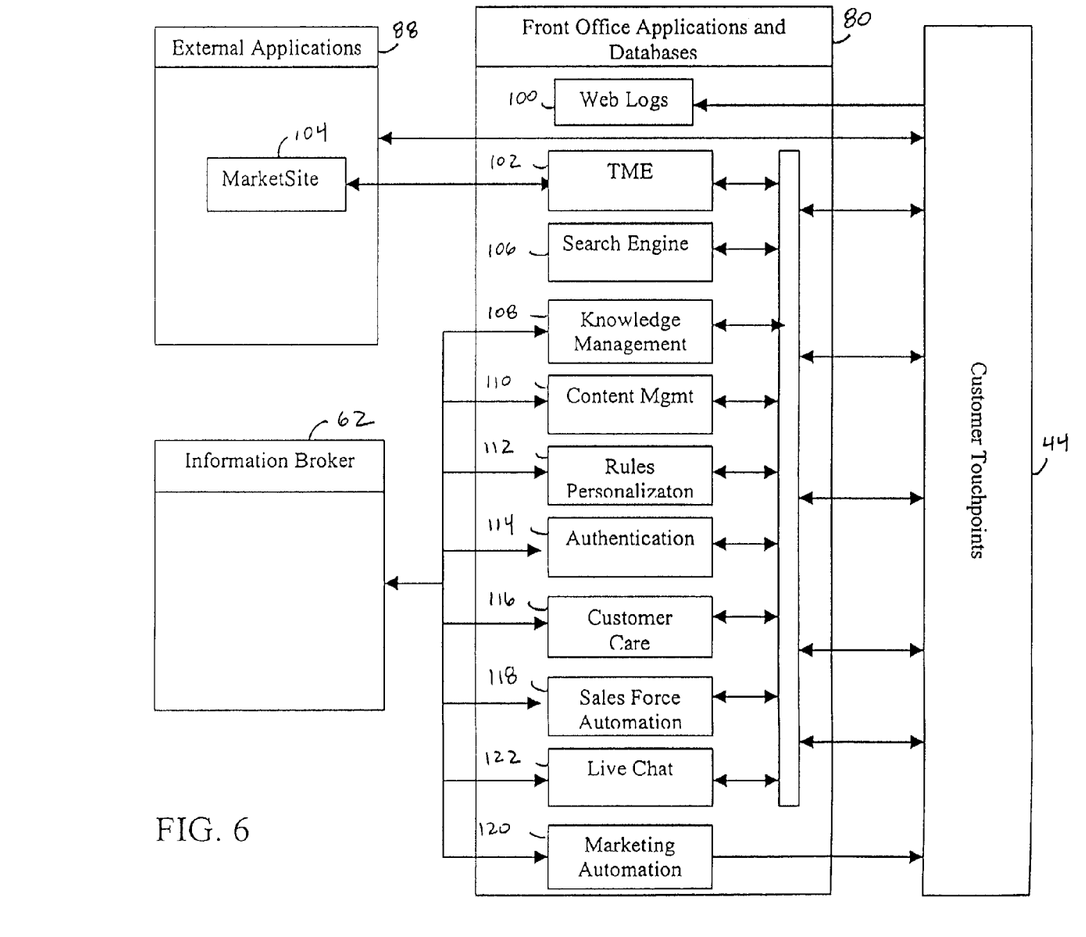

As best illustrated in FIG. 6, the front office applications and databases 80, in coordination with the information broker and the external applications, may perform a myriad of functions to assist an employee. In the illustrated embodiment, one of the front office applications is a web log 100. The web log 100 logs all web pages hosted by the site with basic information, such as the URL, date and cookies. Another application that is used in the illustrated embodiment is a Transaction Marketplace Engine (TME) 102. The TME 102 is used to manage electronic commerce, or e-commerce, transactions. Information may be provided to the TME from other applications, and from the TME to other applications, such as an external Market Site 104.

The illustrated embodiment also includes a search engine 106 to provide the employee with the ability to search for tools on the website. The search engine 106 may also be configured to search throughout the Internet for tools. Processes, procedures, contacts and information on how to run the business are managed by a knowledge management application 108. A content management application 110 is used to provide directory and workforce tools to help organize the content of information sent to the various touchpoint applications and to allow for collaborative development of applications. A rules personalization application 112 is used to provide the rules for the presentation of web pages. An authentication application 114 is used for security as well as to develop customer/employee profiles. The authentication application is used to identify the employee and determine the extent of access to the various applications and data stored on the system. A customer care application 116 is used to manage customer/employee issues. A sales force automation application 118 is used to provide sales force personnel with tools, such as contact management and scheduling. A marketing automation application 120 is used to deliver personalized messages to customer/employees via the website, e-mail, etc. A chat/instant messaging application 122 is also used to allow employees to communicate directly with each other, specific partners, or others similarly interested. Additionally, each front office application may have its own specific data model and database.

Figure 7:
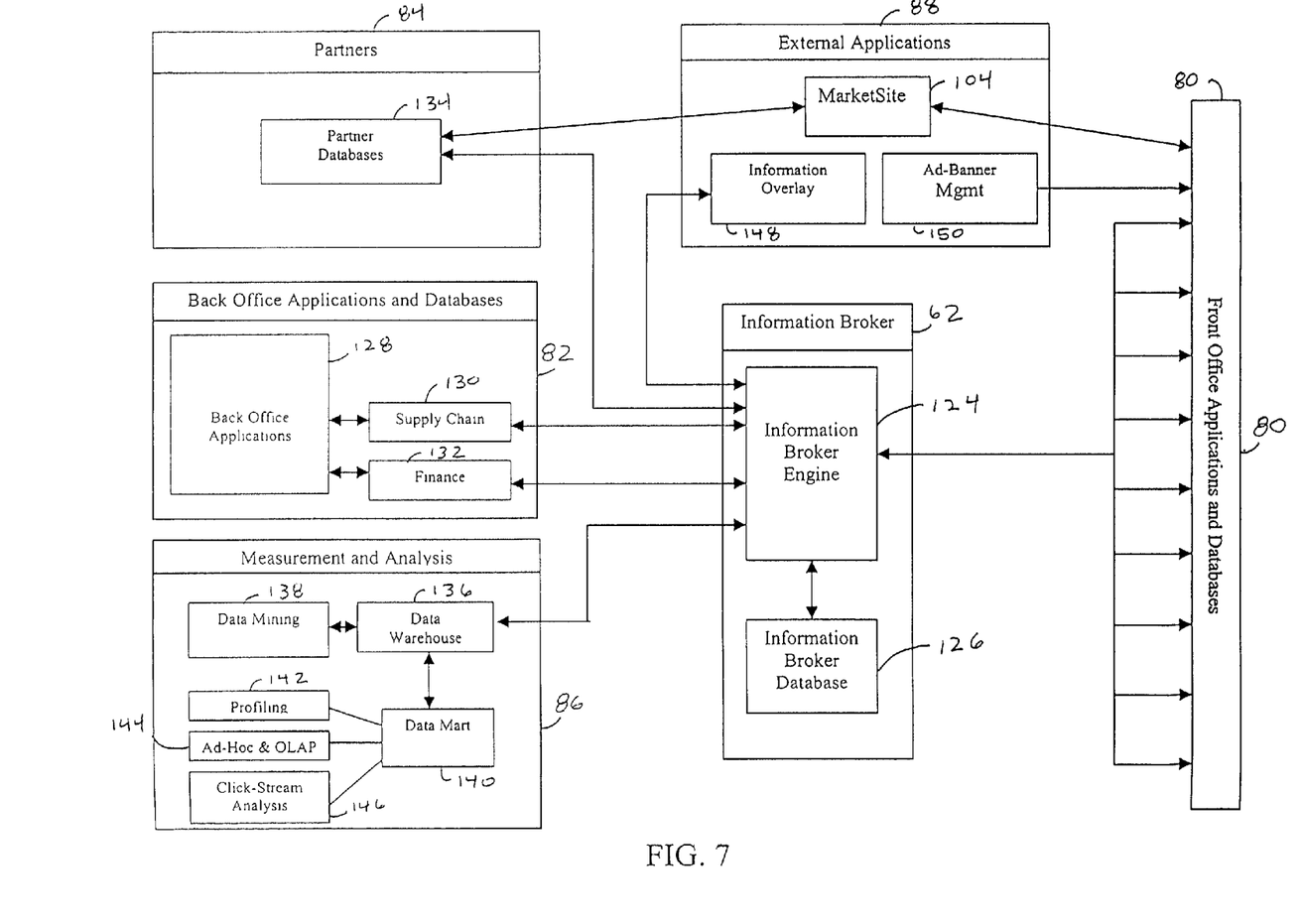

As best illustrated in FIG. 7, the information broker 62 includes an engine 124 and a database 126. The engine 124 operates to move information around the system to the various applications, according to a set of rules. The set of rules, metadata, logs and information required for recovery and batch movement are stored in the database 126. The engine code may be constructed from customized code, such as C++, utilize RDBMS tools, migration tools, or a number of other software tools.

The back office applications and databases 82 may include applications to manage financial services, such as accounts receivable and accounts payable. The back office applications 128 may separately maintain or coordinate operation of the supply chain databases 130, such as inventory, manufacturing and shipping, as well as finance databases 132.

In the illustrated embodiment, information is also obtained from databases maintained by partners or preferred providers 84. Partner/preferred provider databases 134 are used to store a variety of pertinent information, such as the cost and availability of goods, and shipment tracking information. This information may be obtained in real time or periodically.

In the illustrated embodiment, the information broker 62 is also used to enable the measurement and analysis applications 86 to store and analyze information. This portion of the website may be used to personalize the website for each customer/employee. In the illustrated embodiment, the measurement and analysis applications include a data warehouse 136. The data warehouse 136 stores customer/employee data for the business, e.g., customer/employee names, communications, transactions, and demographics. The information broker 62 may update this information in real time or on a periodic basis. The illustrated embodiment also includes a data mining application 138. The data mining application 138 uses analysis techniques to isolate data sets and detect employee/customer trends, such as the employee/customer's next purchase. The illustrated embodiment also includes a data mart 140. The data mart 140 includes a variety of tools to assist in analysis and reporting. For example, the data mart 140 may include applications for customer/employee profiling 142, including forecasting and partner/preferred provider reporting. The data mart may also include Ad-Hoc and OLAP 144 for spreadsheet type analysis of reporting topics. The data mart may also include click-stream analysis 146 for profiling such as, measuring the effectiveness of the website based on the web logs or by overlaying web logs on employee/customer information.

In the illustrated embodiment, the information broker 62 is also used to coordinate the system with external applications 88. For example, the information broker 62 may be utilized with an information overlay application 148. The information overlay 148 is a source of additional information available to "overlay" on top of a customer employee's information for use in analysis and segmentation. This information may also be communicated to the Measurement and Analysis applications 86 for profiling. The external applications may also interact directly with the front office applications and databases 80. For example, an advertising banner management application 150 may be used to position advertisements for the website on other websites, thus bringing additional customer/employee's to the website. The information may also be communicated by the information broker 62 to the measurements and analysis applications 86 to determine the overall effectiveness of the advertising.

Figure 8:
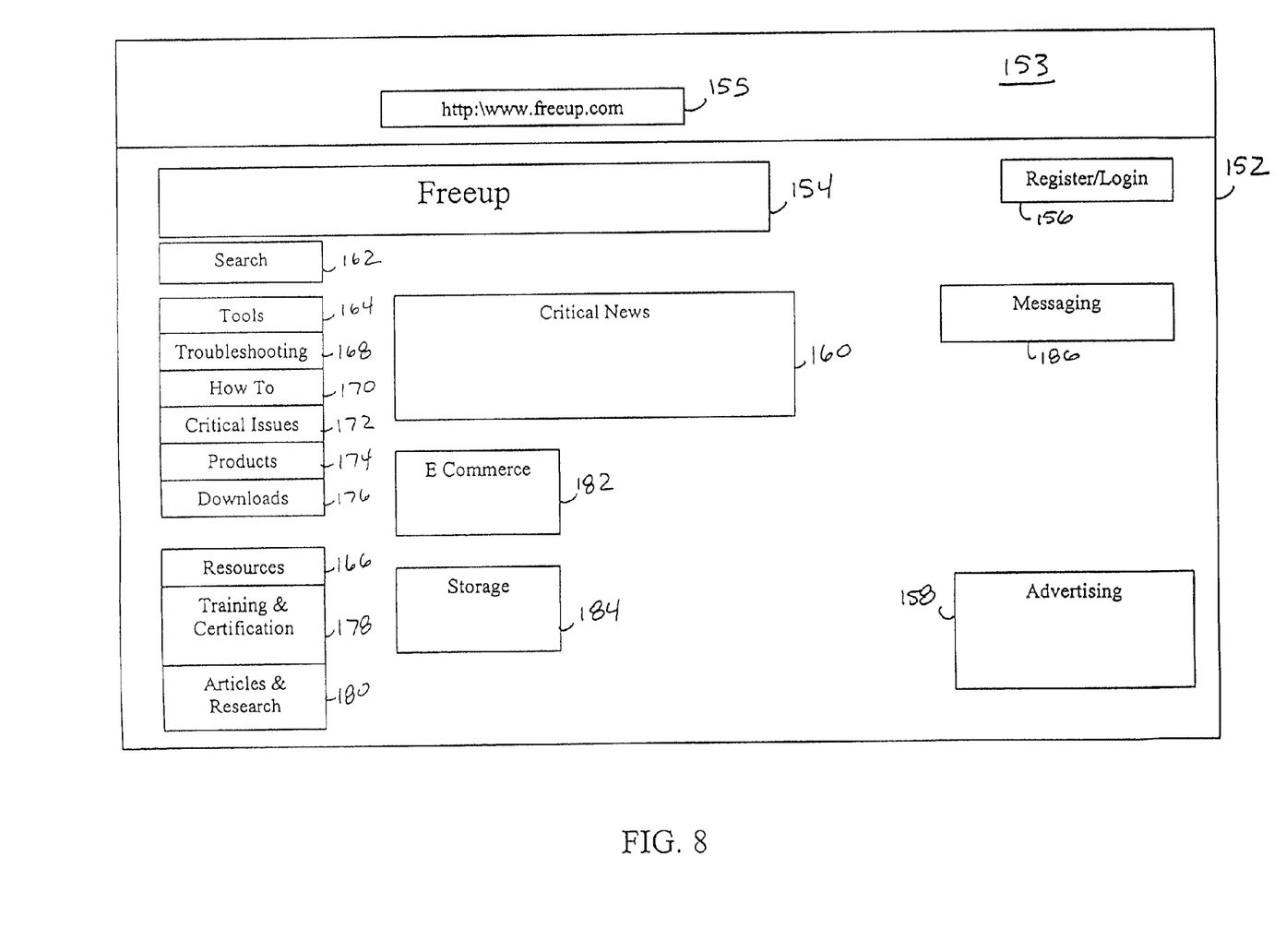
FIG. 8 illustrates an example of a web page for a website that provides an employee with general, job function or industry specific tools, in accordance with the present invention.

An example is provided in FIG. 8 of an embodiment of a web page 152 for a website that provides employees with tools. The web page may be used for a website constructed by a business, as per block 28 of FIG. 1. The web page may also be configurable so that it may serve as part of the hardware, software and services provided by one business to a number of other businesses, as per block 36 of FIG. 1. The web page may also be used as part of an Intranet system, as per block 38 of FIG. 1. The illustrated web page represents what an employee using a computer accessing the website would see. The web page 152 includes a banner 154 identifying the web page as the Home Page for the website.

The web page also includes a number of pull-down menus and buttons that may be operated to send a user to other web pages or to initiate applications, such as the front office applications 80. One of the buttons featured on the illustrated web page is a register/login button 156. The register/login button 156 activates the authentication application 114, illustrated in FIG. 6, to identify the specific user of the website. This information may be used for a variety of purposes, such as to customize the web page for the user based on the employee profiling data or as a security measure to prevent unauthorized access to secure portions of the website. The content management application 110 may configure the web site so that an information technology employee would see a web page configured for use by an information technology employee and a procurement employee would see a web page configured for use by a procurement employee.

The illustrated web page also includes an advertising banner 158. The advertising banner 158 is operated by the Ad-Banner Management 150 application, illustrated in FIG. 7. In the illustrated embodiment, critical news 160 to the employee is also displayed. The critical news 160 may be configured for each user based on the employee profiling data. The profiling data is supplied to these applications from the measurement and analysis applications 86 via the information broker 62.

The illustrated web page also includes a search button 162. The search button activates the search engine 106, illustrated in FIG. 6, to search the website for specific tools. The web page also includes other tools 164 and resources 166 to assist employees perform their jobs. The tools 164 include a troubleshooting menu 168, a "How To" menu 170, a critical issues menu 172, a products menu 174, and a download menu 176. The resources 166 include a training and certification menu 178 and an articles & research menu 180.

An employee desiring to purchase goods or services may activate the E-Commerce button 182. The E-Commerce button 182 activates the Transaction Marketplace Engine 102 illustrated in FIG. 6. The TME may direct the employee to another page in the website or open a window to conduct the transaction. Additionally, the TME may route the request for the goods or services to another portion of the web site where a procurement employee may receive the request on another web page configured to process orders. Alternatively, the TME 102 may route a request directly to a partner, or preferred provider, through the website, or email, via directed approval workflow.

The illustrated web page also includes a number of other functions to assist employees. A storage button 184 directs an employee to an application or file that allows the employee to store information on the web site. Finally, a messaging button 186 directs the employee to communications applications, such as e-mail or instant messaging.

Figure 9:
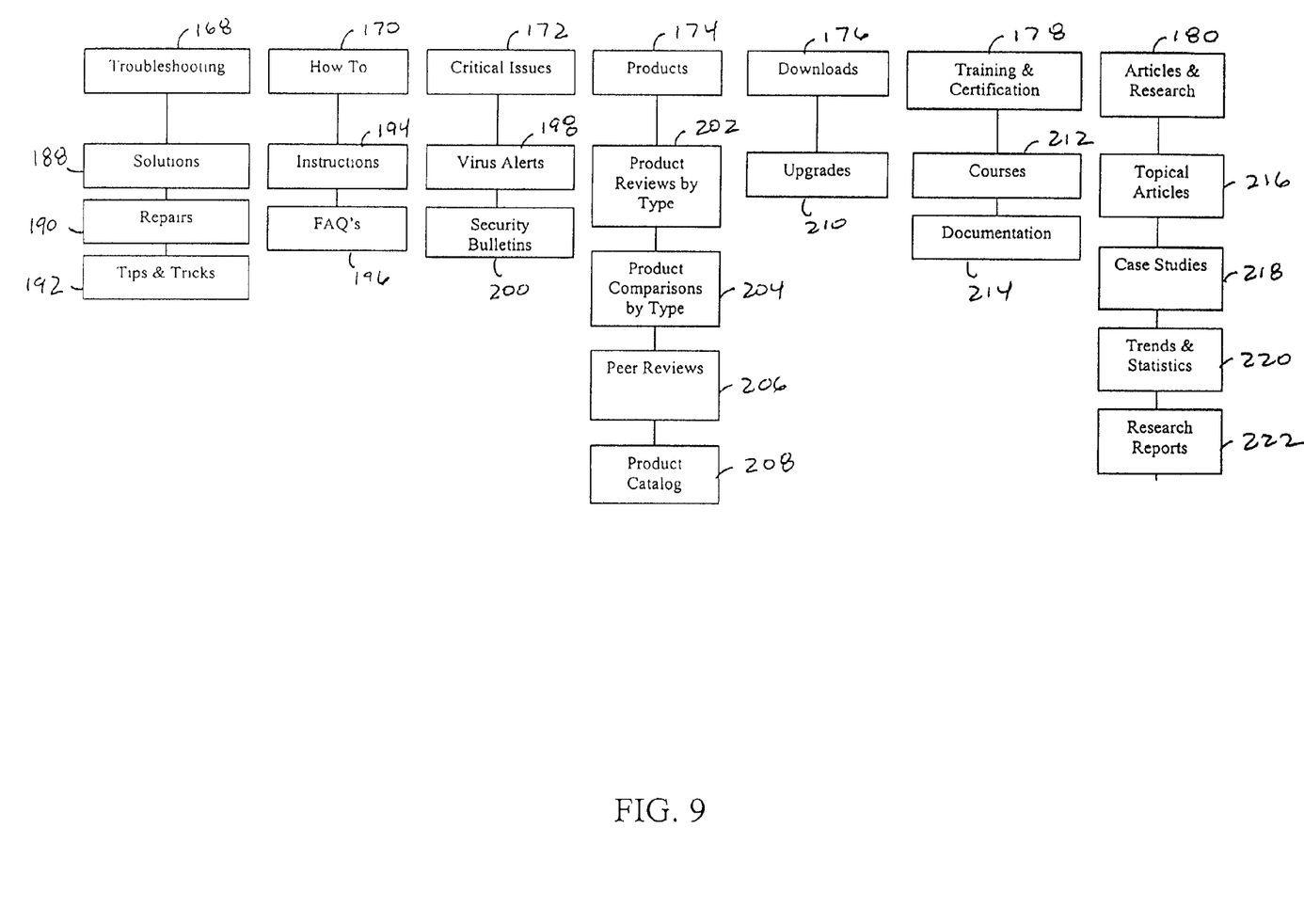
FIG. 9 illustrates an example of additional menus of tools available to an employee at the website of FIG. 8.

As best illustrated in FIG. 9, the various menus direct the employee to sources of tools. For example, the troubleshooting menu 168 may include a solutions application 188 that may assist the employee in identifying and correcting problems, information on repairs 190, or "Tips & Tricks" 192 provided by a preferred provider. The "How To" menu 170 may provide the employee with additional information such as instructions 194 on how to perform certain tasks or frequently asked questions, FAQ's 196. The critical issues menu 172 may provide the employee with virus alerts 198 or security bulletins 200. The products menu 174 may be used to obtain a variety of information about goods, such as product reviews by type of good 202, product comparisons 204, peer reviews 206, and a product catalog 208. The download menu 176 may be used to provide employees with upgrades 210 to download from the website.

The resources portion 166 of web page 152 also provides a variety of tools. A training and certification menu 178 may be used to identify training courses 212, to sign up for training courses, or to document courses completed 214. The articles and research menu 180 may be used to provide an employee with topical articles 216, research or perform case studies 218, analyze trends or perform statistical analysis 220, or read or write research reports 222. In the illustrated embodiment, the information provided from external sources are connected to the website via a closed-link so that the employee experiences a seamless web environment. Furthermore, this is not an exclusive list of tools available from the web site.

Figure 10:
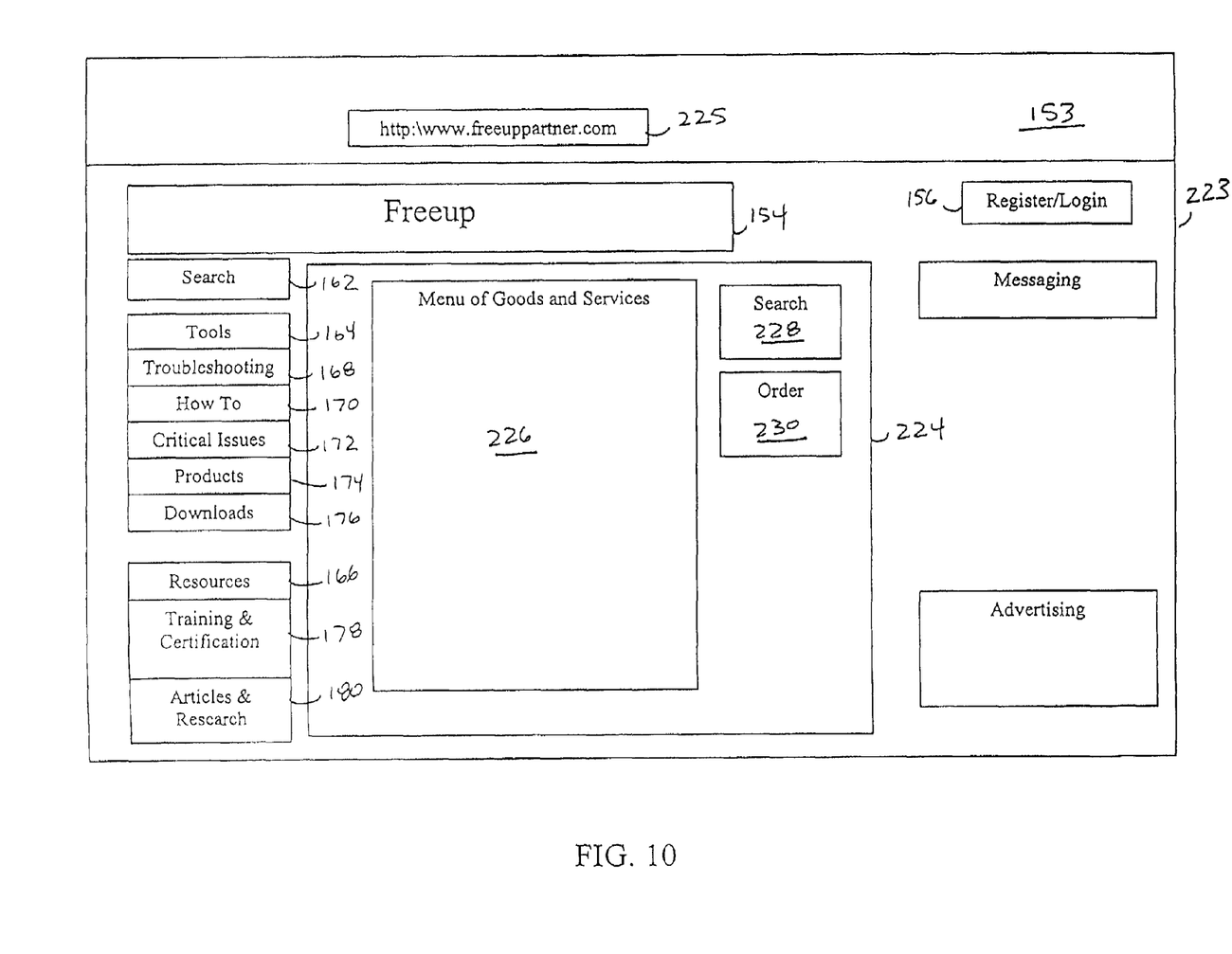
FIG. 10 illustrates an example of the web page illustrated in FIG. 8 when linked to a second website, in accordance with the present invention.

An example is provided in FIG. 10 of an exemplary embodiment of a web page 152 for a website that is electronically linkable to a second website operated by a partner business. The partner business and the operator of the website coordinate the structure and operation of their respective websites. Coordination in the selection and operation of the two websites hardware and software facilitates forming a seamless electronic link, as well as producing a consistent overall appearance in the web pages of the two websites. For example, the partner website may require a login before allowing a user to access the partner website to utilize tools to obtain information, goods, or services. As an example of coordination, the partner business may provide the website system with the proper login. The login to the second website may be stored along with the employee's login to the first website. When the first website system links to the partner website system, the first website system may automatically provide the partner website system with the proper partner website login, rather than the employee. Each employee may be allocated their own login for accessing the second website or the employee's employer may be provided with a global identifier for use by all of its employees.

In the illustrated embodiment, an employee can utilize window 224 to select from a menu 226 of tools to provide information, goods, or services. Alternatively, an employee can activate a search button to search the second website for desired information, goods, or services. Once a desired good or service is found an employee activates an order button 230 to initiate the purchase of the good or service. In the illustrated embodiment, an employee activating an option, such as the E-Commerce button 182 of FIG. 8, activates a link to a second website operated by a partner business. Because of the coordination between the two businesses, the overall appearance of the web page does not noticeably change when an employee is linked to the partner business's website from web page 152. In the illustrated embodiment, the system creates a window 224 in web page 152 to allow an employee to interface with the partner business' website. Alternatively, an employee could be transferred to partner business web page. The configuration of the partner business' web page is coordinated with the first business' website so that the overall appearance is identical to web page 152. To an employee, it would appear that they were at a web page provided by a first business when, in fact, they are at a second web page provided by a partner business.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system to enable employees of an identified company to perform employment-related functions for the identified company, the system comprising:

a first electronic information system being accessible from a first website hosted by the first electronic information system, the first electronic information system comprising:

data related to the identified company stored in electronic storage;

a plurality of tools to enable the employees of the identified company to perform a plurality of employment-related functions for the identified company, each tool utilizing the company-related data to perform its intended function; and a data engine operable to provide a link between the first website hosted by the first electronic information system and a second website hosted by a second electronic information system operated by a business partnered with the identified company, the first and second websites having the same look and feel.

2. The system as recited in claim 1, wherein the first electronic information system comprises a first application to identify each of the employees using the system.

3. The system as recited in claim 1, wherein the first electronic information system comprises a second application to configure a website interface based upon the identity of each of the employees accessing the system.

4. The system as recited in claim 1, wherein the first electronic information system comprises a third application to record each of the employees' use of the system.

5. The system as recited in claim 1, wherein the first electronic information system comprises a fourth application that enables the system to develop employee profiles based upon each of the employees' use of the system.

6. The system as recited in claim 3, wherein the second application configures the appearance of the website interface based upon profiles of the employees.

7. The system as recited in claim 3, wherein the second application configures the website interface by employment function of each of the employees.

8. The system as recited in claim 1, wherein the web site interface is arranged topically by subject matter of the tools.

9. The system as recited in claim 1, wherein the plurality of tools comprise at least one application.

10. The system as recited in claim 2, wherein the system utilizes the first application to identify the employee using the system and to provide the employee with a menu of tools based on the identity of the employee.

11. An electronic information system for providing tools to employees of an identified company to perform employment-related functions for the identified company, the system comprising:
an information database containing data related to the identified company;
an interactive Internet website that enables only the employees of the identified company to access and interact with the electronic information system;
a plurality of tools that direct the system to perform operations to assist the employees to perform employment-related functions for the identified company;
an information engine that operates between the information database and the plurality of tools;
an application to identify each of the employees accessing the system, wherein the system configures the interactive Internet website based on each employees' identity, and
a data engine operable to provide a link between the interactive Internet website and an external Internet website, the interactive Internet website and the external Internet website being coordinated so they both have a similar appearance.

12. The system as recited in claim 11, wherein the interactive Internet website comprises a plurality of web pages, each web page configured by a configuration application according to the employment function of the employee.

13. The system as recited in claim 11, wherein the system is operable to develop a profile of each of the employees based on each employee's use of the system.

14. The system as recited in claim 11, wherein the data engine provides the link to the external Internet website in a manner transparent to the employees.

15. A method of using a computer system to provide tools to employees of a first company to enable the employees to perform employment-related functions, the method comprising:
providing a first computer system with programming to enable the first computer system to host a first website;
enabling a second company to host a second website having the same look and feel as the first website, wherein the first website is linked to the second website to enable the employees of the first company to obtain second company-related data via the second website without appearing to leave the first website;
providing the first computer system with first company-related data and a plurality of applications stored in memory to form a plurality of tools accessible by the employees of the first company via the first website, each tool performing an employment-related function for the employee; and
providing the first computer system with a data engine operable to locate specific first company data and second company data and to transfer the specific first company data and second company data to an application to enable the plurality of tools to perform their employment-related functions.

16. The method as recited in claim 15, comprising the act of:
providing the system with a tool that enables an employee to obtain information or services via the second website.

17. The method as recited in claim 15, comprising the act of:
providing the system with a tool that enables an employee to request goods or services via the first website.

18. The method as recited in claim 15, comprising the act of:
providing the computer system with an application to identify each employee accessing the first website.

* * * * *